March 1, 1927.   L. E. ROBY   1,619,795
FERTILIZER DISTRIBUTOR
Filed Dec. 1, 1924   3 Sheets-Sheet 1

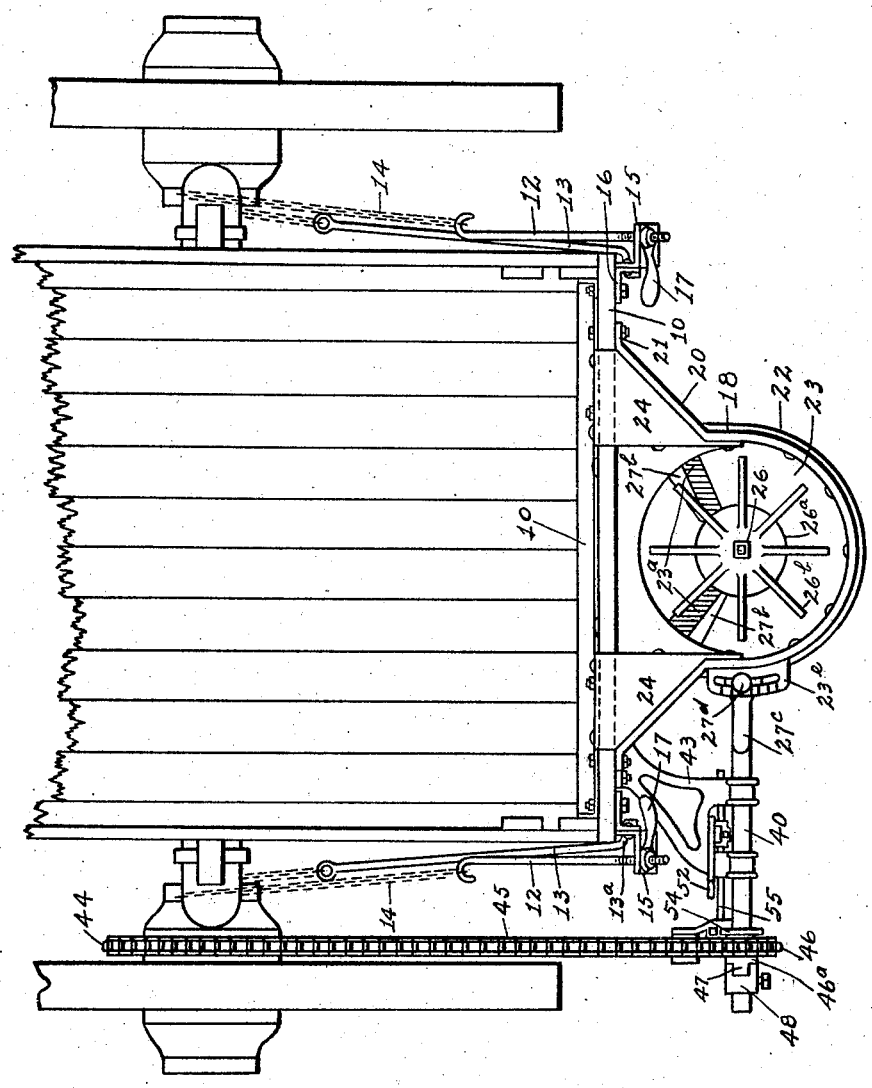

March 1, 1927.

L. E. ROBY

FERTILIZER DISTRIBUTOR

Filed Dec. 1, 1924     3 Sheets-Sheet 3

Inventor
Luther E. Roby
By Tefft & Tefft
Attys

Patented Mar. 1, 1927.

1,619,795

UNITED STATES PATENT OFFICE.

LUTHER E. ROBY, OF PEORIA, ILLINOIS.

FERTILIZER DISTRIBUTOR.

Application filed December 1, 1924. Serial No. 753,360.

This invention relates to fertilizer distributors.

The invention has special reference to a fertilizer distributor of the broadcast type.

The invention has for one of its objects, the provision of a closure structure for the rear end of a wagon that may be attached without removal of the end gate.

A further object of the invention is the provision of a broadcasting device, wherein a single distributor is employed.

Another object of the invention is to provide a device wherein the materials to be distributed, may be fed through conductor members to a fan as distinguished from an openway bulk deposit device that employs augers to deflect materials to double fan distributors.

The invention includes auxiliary stirring means which may, at option, be interposed for conjunctive activity with the regular agitator feeding means.

The invention also includes attachment means of special design for supporting the closure member of the device against the rear edges of the wagon body, without requiring connection with the endgate cleat members thereof, which means also comprehends the holding of the closure member of the distributing device against lateral movement.

The invention also includes specially designed gearing and the relationing of the same to operating parts of the device to promote the utmost efficiency and utility thereof and to general functioning relationships of the several parts to attain the results herein contemplated.

Referring to the drawings, Fig. 1, is a rear view of my device attached to a wagon box, and having a part broken away to permit a showing relative to an auxiliary stirring device.

Fig. 2, is a plan view of a portion of a wagon box, showing my device attached thereto.

Figure 1:
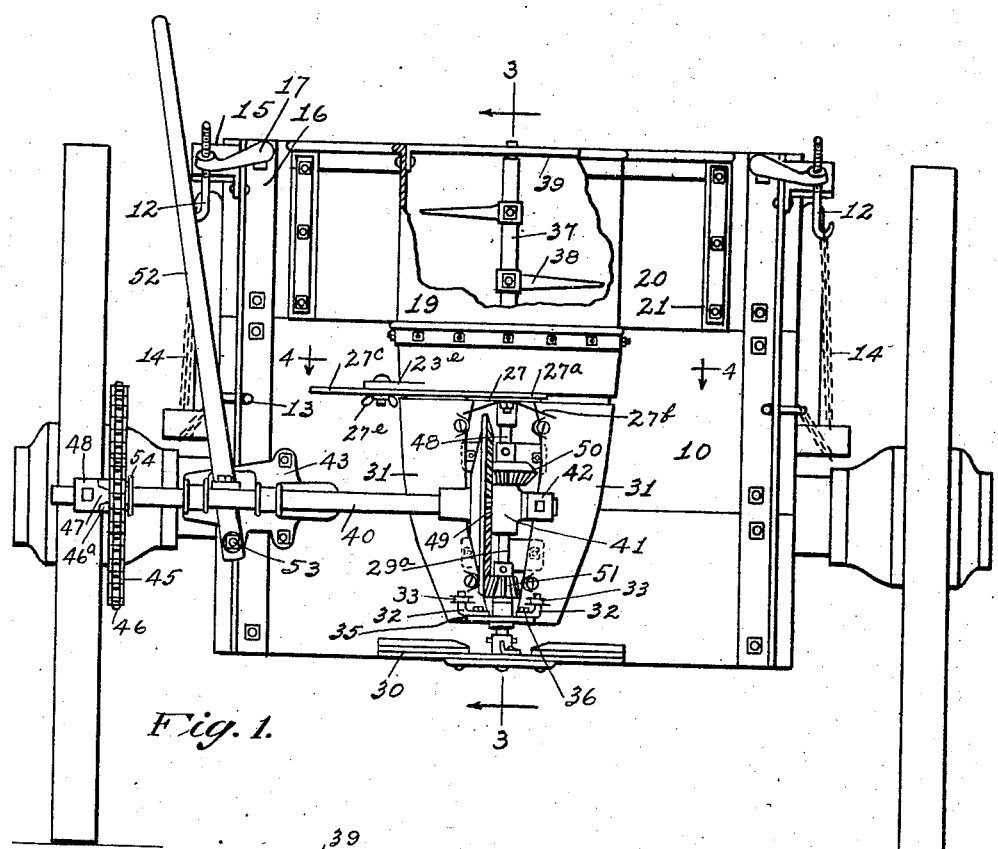
Figure 3:
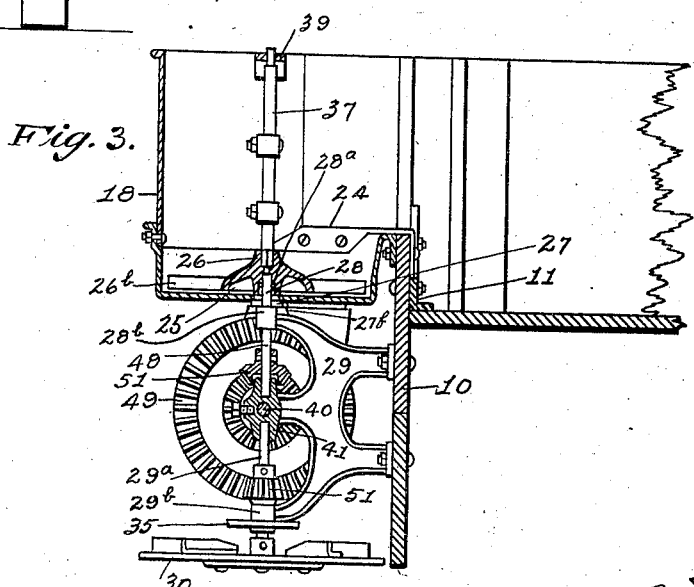
Fig. 3, is a vertical sectional view on the line 3—3 of Fig. 1.

Referring to the drawings, and particularly to Figs. 1, 2, and 3, they refer generally to a closure member for the rear end of a wagon box, adapted, when applied, to abut against the end of the wagon box and to be detachably held thereon by specially provided means which will hereinafter be described. The closure member is incisioned at its upper central portion to provide a clearance way therethrough, the lower portion of said incisioning being made at a point above the surface of the bottom of the wagon box, and 11, refers to an angle bar member attached to the inner face of the closure member serving for seating said member in conjunction with the bottom of the wagon box.

The attachment means include two sets of rods as 12 and 13, connected respectively by chain members as 14, said attachment sets being connected with sets of bracket members as 15 and 16, attached to the edges of the closure portion of the fertilizer distributor unit. Rod member 13, of the attachment sets is fashioned with a hooked portion 13$^a$, at its outer end, which is designed to be entered through a slot in bracket 16 and the outer end of rod member 12 of such sets is threaded and is adapted to be supported in a perforation through bracket 15, and a wing nut 17, applied thereto, whereby, when the attachment sets are adjusted with respect to the wagon bolster and their opposed ends connected respectively with bracket members 15 and 16, they may be properly tensioned, through the wing nut members, to cause the closure member of the fertilizer distributor to be held against the end of the wagon box. The relationing of the tensioning members with respect to the sides of the wagon box and the lateral edges of the closure member, is such that not only will said closure member be properly supported in conjunction with the wagon box, but will, likewise, be held against lateral movement with respect thereto. Through the means of attachment of the fertilizer distributor unit to the wagon box, as herein disclosed, it will be observed that there is no requirement for connection with the normal end gate cleats, and that the end gate is not required to be removed in attaching the fertilizer distributor unit.

Referring now to details with respect to the deflecting and measuring feature of the device, attention is called to a rearwardly extending portion of the closure member, comprising a part generally referred to as 18, which serves as a closure for the incisioned portion of the general closure member 10. This part 18 is fashioned semicircularly as at 19 at its outer portion, and with divergent members 20 at its inner portion, which terminate in perforated flanged portions 21 for seating and attachment in conjunction with the marginal edges of the incisioned portion of the general closure member. 22 refers generally to a bottom closure member, said member forming a discharge center or hopper portion 23, intended to furnish a seat for a revoluble material deflector member as well as a receiving center into which materials are deposited. The hopper is fashioned with a plurality of openings $23^a$ in its bottom portion, and has depending discharge leads $23^b$ about said openings and depending therefrom, and an opening at its center as $23^c$. 24 are ledge portions forming part of the bottom closure of the rearwardly extending portion of the general closure structure, said ledges being disposed in a plane coincident with the top of the hopper and having no functioning utility in connection with the delivery of materials to the hopper, but merely constituting filler portions for the bottom of the hopper.

Referring now particularly to means operatively to effect deflection for discharge from the hopper, 25 is a web fashioned member seated in the hopper having the hub portion 26 expanded at its lower portion as at $26^a$, to overlie opening $23^c$ in the bottom of the hopper, and there is provided a plurality of relatively spaced sweep members $26^b$, each preferably fashioned at one side with a downward incline rearwardly of the direction of its normal travel said sweep members in travel course being designed to deflect materials deposited in the hopper to the discharge outlet ways in the bottom of the hopper and said hub portion being also fashioned axially with seats respectively for an agitator member and for a driving member.

Figure 4:
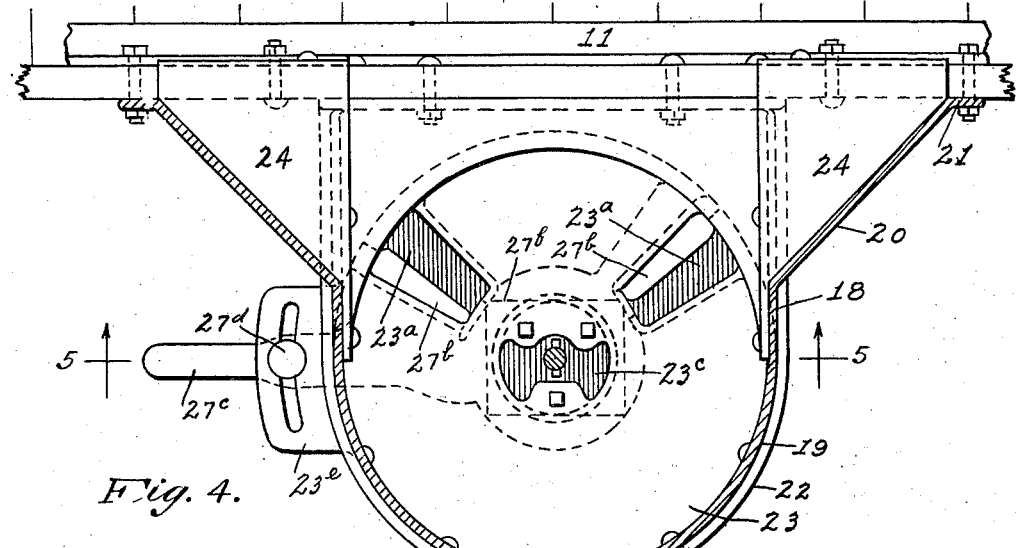
Fig. 4, is a cross sectional view on the line 4—4 of Fig. 1.
Figure 5:
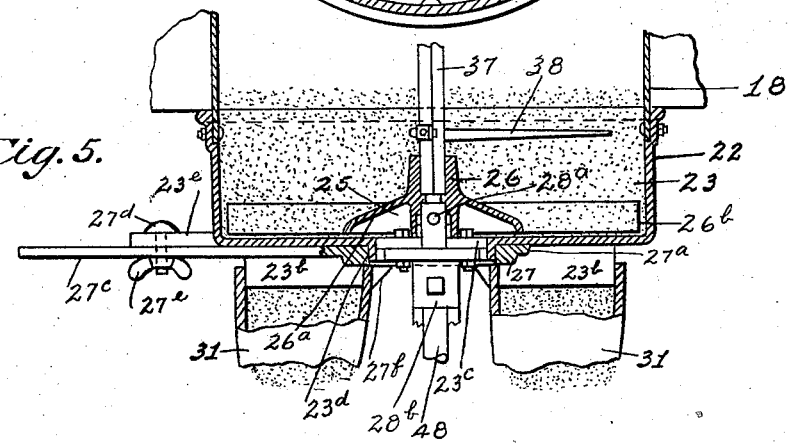
Fig. 5, is a vertical sectional view on the line 5—5 of Fig. 4.

For controlling the discharge of materials from the hopper, I have provided a circular valve member generally referred to as 27, and including a ring member $27^a$, seated about a depending flange member $23^b$ from the central portion of the hopper. Blade portions $27^b$, (see Fig. 4) are shiftable within and through slotted ways in depending discharge leads $23^b$, from the hopper 23. The control mechanism includes an adjusting arm $27^c$, having a shiftable support connection with flange member $23^e$, upon hopper 23. To effect such support and relative adjustment between arm 27 and flange $23^e$, an arcuate slot is provided in the flange and a perforation in the arm. A bolt $27^d$ and wing nut $27^e$, are provided to effect relative release or engagement as between said arm and flange, whereby the blade portions of the valve may be set with reference to the discharge way openings in the hopper in any position desired to control discharge from said hopper. 27 is a refuse deflector attached to the bottom of the hopper and located just below the opening $23^c$ therein and serves to catch and deflect refuse material that escapes from the hopper through said opening and to deposit same in clearance of gear mechanism located beneath it.

Referring to the supporting and operating mechanism below the hopper, 28 is a shaft attached to hub member 26 by means of pin $28^a$ and supported in sleeve members $28^b$ and at its lower end in a seat in bracket member 29, said bracket member in turn being fixed to closure member 10. A shaft $29^a$ is supported in a sleeve member $29^b$ on bracket 29 and at its upper end in a seat in conjunction with said bracket. To the lower end of shaft $29^a$ is fixed fan member 30, the latter being provided with radially disposed, relatively spaced deflector members which are disposed and fashioned as may be desired to meet conditions of practical use.

Figure 6:
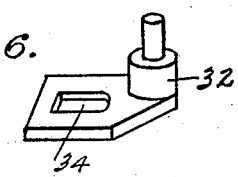
Fig. 6, is a detailed perspective view of an adjustable lug or link connecting spout members with the body of the device.
Figure 7:
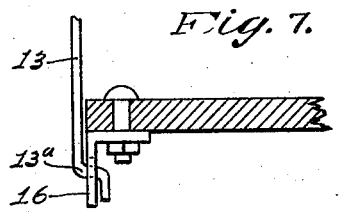
Fig. 7, is a detailed view partially in section, illustrating a bracket and rod relationing for special functioning, in connection with the means herein shown for attaching the closure element of my device to the end of the wagon box.

For effecting conduct and discharge from the hopper to the fan, and for regulating fan distribution, I have provided spout members 31 sleeved upon depending members $23^b$, leading from the exit ways from the bottom of the hopper, said spouts being supported at their lower ends upon adjustable lug members 32 through engagement of said lug members with perforations in brackets 33 on said spouts. Lug members 32 are fashioned with lots 34 (see Fig. 6) and are supported upon flange members 35, the latter forming a part of bracket member 29. There is provided a nut and bolt as 36 to fix said lugs in desired relative adjustment. For functioning relationship of the spouts to the fan, the supporting means above described facilitates moving the lower ends of the spouts either towards or from the axial center of the fan, or in a direction circumferentially thereof to regulate points of discharge respectively from the spout members upon the fan to control the matter of spread or distribution of material by the fan.

Under what we might call normal conditions of materials, a mere deposit of such materials in the hopper will insure proper deflection thereof from the hopper to the fan without employing any supplementary agitation. However, in order that abnormal material conditions may be met, I have provided an agitator or stirring device, consisting merely of a shaft 37 which may be provided with a plurality of relatively spaced stir fingers 38, said fingers being capable, at option, of being entered within the upper axial opening in hub member 26, from which connection rotation of such agitator would be effected in conjunction with the driving operation of the normally necessary parts of the machine. The upper end of the shaft member 37 of the agitating means may be supported through turnable engagement in connection with a cross bar member as 39 overlying, and detachably connected with, the upper portion of the rearwardly extending part 19 of closure member 10. As it is apparent that a turning of shaft 37 will effect disintegration and stirring of material deposited within the hopper through the action of the agitator member, no further description will be here entered with reference to such optionally usable agitator.

Referring to the driving means for the movable functioning parts of the device, 40 is a drive shaft supported at its inner end in conjunction with boxing member 41 forming a part of bracket 29, and is held against linear projection by means of set collar 42 at the inner extremity of said shaft. Said drive shaft is supported intermediate its ends in bracket member 43, said bracket member in turn being supported by suitable attachment to closure member 10. Shaft 40 is driven from a sprocket member 44 fixed to the hub of the wagon by means of sprocket chain 45 engaging sprocket wheel 46 fashioned with a sleeve portion 46$^a$ supported on shaft 40 and normally loose thereon, said sleeve being fashioned with clutch member 47 adapted for engagement with clutch 48 fixed to the outer end portion of said shaft 40. 49 is a bevel gear fixed to shaft 40 and meshing with bevel gears 50 and 51 respectively fixed to shafts 48 and 29$^a$, thereby effecting a driving connection to operate the deflector member in the hopper and the fan distributor member.

To control movement of shaft 40, I have provided a shifting means for clutch 46$^a$, which includes a shifting lever 52 pivoted as at 53 in conjunction with bracket 43. A furcated clutch shift 54 cooperates with a grooved seat in clutch member 46$^a$, and a connecting arm 55, between said lever, clutch shift member and suitable supporting parts for said members, whereby operation of said lever 52 may optionally effect engagement or release as between the clutch members respectively on the driving means and said shaft.

What I claim is:

1. In a device of the class described, in combination, a wagon box, a scattering unit fashioned for attachment to the rear end of said wagon box, said scattering unit including a supporting portion, a hopper attached thereto, a fan disposed below said hopper, conducting means between the hopper and fan, said conducting means having both radial and circumferential adjustment with respect to said fan member.

2. In a device of the class described, in combination, a material receiving hopper, a fan disposed below the hopper, a shield member adapted for attachment to a wagon box, said member projecting a substantial distance below and in front of the fan member, means for rotating said fan, and conducting means between the hopper member and fan member, said conducting means being both radially and circumferentially adjustable with respect to said fan member for the purpose of providing an even distribution of material over an area substantially less than a complete circle.

In testimony whereof I affix my signature.

LUTHER E. ROBY.